(12) United States Patent  (10) Patent No.: US 12,337,783 B2
Miura  (45) Date of Patent: Jun. 24, 2025

(54) PASSENGER SEAT AIRBAG DEVICE

(71) Applicant: Autoliv Development AB, Vargarda (SE)

(72) Inventor: Yuka Miura, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/717,800

(22) PCT Filed: Oct. 4, 2022

(86) PCT No.: PCT/JP2022/037183
§ 371 (c)(1),
(2) Date: Jun. 7, 2024

(87) PCT Pub. No.: WO2023/105902
PCT Pub. Date: Jun. 15, 2023

(65) Prior Publication Data
US 2025/0042353 A1 Feb. 6, 2025

(30) Foreign Application Priority Data

Dec. 10, 2021 (JP) ................................. 2021-201265

(51) Int. Cl.
*B60R 21/205* (2011.01)
*B60R 21/2346* (2011.01)
(Continued)

(52) U.S. Cl.
CPC ........ *B60R 21/205* (2013.01); *B60R 21/2346* (2013.01); *B60R 2021/23509* (2013.01);
(Continued)

(58) Field of Classification Search
CPC .............. B60R 21/205; B60R 21/2346; B60R 2021/23509; B60R 2021/23538;
(Continued)

(56) References Cited

U.S. PATENT DOCUMENTS 5,275,434 A * 1/1994 Hirabayashi ............. D03D 1/02
139/389
5,454,594 A * 10/1995 Krickl ................... B60R 21/231
280/743.1
(Continued)

FOREIGN PATENT DOCUMENTS

JP 49-087035 A 8/1974
JP H04339047 A * 11/1992
(Continued)

*Primary Examiner* — Laura Freedman
(74) *Attorney, Agent, or Firm* — Foley & Lardner LLP (57) ABSTRACT

An airbag device for protecting an occupant in a passenger seat of a vehicle, is stowed in the instrument panel, and is provided with an inflator that generates expansion gas and an airbag for restraining the occupant that expands and deploys from the instrument panel towards the occupant side based on the gas discharged from the inflator. The airbag is formed of woven cloth with mutually orthogonal warp thread and weft thread. The airbag includes an occupant side panel facing the occupant and side surface panels that are connected by a seam to a peripheral end part of the occupant side panel and from side surfaces of the airbag. Furthermore, the occupant side panel and the side surface panels are connected so the fabric of both panels approximately match at a connection point.

14 Claims, 9 Drawing Sheets

(51) Int. Cl.
  *B60R 21/235* (2006.01)
  *B60R 21/261* (2011.01)
(52) U.S. Cl.
  CPC .............. *B60R 2021/23576* (2013.01); *B60R 2021/2612* (2013.01)
(58) Field of Classification Search
  CPC ........... B60R 2021/23542; B60R 2021/23576; B60R 2021/2612
  See application file for complete search history.

(56) References Cited

U.S. PATENT DOCUMENTS

| | | | | | |
|---|---|---|---|---|---|
| 5,884,574 | A | * | 3/1999 | Sogi | B60R 21/235 280/743.1 |
| 6,382,664 | B1 | * | 5/2002 | Hirano | B60R 21/233 280/730.2 |
| 6,478,332 | B1 | * | 11/2002 | Ono | B60R 21/231 280/743.1 |
| 6,523,855 | B2 | * | 2/2003 | Musiol | B60R 21/233 280/732 |
| 7,048,304 | B1 | * | 5/2006 | Keshavaraj | B60R 21/231 280/743.1 |
| 7,150,470 | B2 | * | 12/2006 | Okada | B60R 21/205 280/736 |
| 8,186,715 | B2 | * | 5/2012 | Miyata | B60R 21/2338 280/743.2 |
| 8,196,957 | B2 | * | 6/2012 | Kubo | B60R 21/231 280/743.2 |
| 8,308,187 | B2 | * | 11/2012 | Miyata | B60R 21/2338 280/743.1 |
| 8,955,879 | B2 | * | 2/2015 | Aranzulla | B60R 21/231 280/743.1 |
| 9,434,343 | B2 | * | 9/2016 | Motomochi | B60R 21/231 |
| 10,543,804 | B2 | * | 1/2020 | Ochiai | B60R 21/235 |
| 2024/0286574 | A1 | * | 8/2024 | Abe | B60R 21/235 |

FOREIGN PATENT DOCUMENTS

| | | | | | |
|---|---|---|---|---|---|
| JP | H07125587 | A | * | 5/1995 | |
| JP | 07-172257 | A | | 7/1995 | |
| JP | 07-315152 | A | | 12/1995 | |
| JP | 2001-191882 | A | | 7/2001 | |
| JP | 2006-175934 | A | | 7/2006 | |
| JP | 2007-223396 | A | | 9/2007 | |
| JP | 2008-013162 | A | | 1/2008 | |
| JP | 2009-262658 | A | | 11/2009 | |
| JP | 2010-149594 | A | | 7/2010 | |
| JP | 2010-274901 | A | | 12/2010 | |
| JP | 2011173471 | A | * | 9/2011 | |
| JP | 2014121965 | A | * | 7/2014 | ........... B60R 21/205 |
| JP | 2014121966 | A | * | 7/2014 | |

* cited by examiner

PASSENGER SEAT AIRBAG DEVICE

TECHNICAL FIELD

The present invention relates to a passenger seat airbag device for protecting an occupant riding in a passenger seat of a vehicle.

BACKGROUND ART

The provision of a vehicle with one or more kinds of airbags in order to protect an occupant in the event of a vehicle accident is well known. There are various forms of airbags, including, for example, a so-called driver airbag that expands from a vicinity of a center of a steering wheel of an automobile in order to protect a driver, a passenger airbag that expands from the instrument panel in order to protect an occupant in a passenger seat, a curtain airbag that deploys downward inside a window of the automobile in order to protect the occupant in the event of an impact in the vehicle lateral direction or an overturn or rollover accident, and a side airbag that deploys from a side of a seat in order to protect the occupant in the event of an impact in the vehicle lateral direction. The present invention relates to an airbag device for a passenger seat.

Here, deployment shape is not easy to control for an airbag for the passenger seat that is relatively large and receiving the occupant with a non-deviating uniform pressure is difficult. In particular, in a case of an oblique impact from the front of the vehicle, an occupant enters the deployed airbag at an irregular position and angle, and there are cases where the head of the occupant cannot be suitably protected.

SUMMARY OF THE INVENTION

Problem to be Solved by the Invention

In light of the problem described above, an object of the present invention is to provide an airbag device that enables suitably restraining an occupant riding in a passenger seat of a vehicle through precise control of a deployment shape of the airbag.

Means for Solving the Problem

In order to resolve the problem described above, the present invention is an airbag device for protecting an occupant in a passenger seat of a vehicle, is stowed in the instrument panel, and is provided with an inflator that generates expansion gas and an airbag for restraining the occupant that expands and deploys from the instrument panel towards the occupant side based on the gas discharged from the inflator. The airbag is formed from woven fabric of mutually orthogonal warp thread and weft thread. The airbag includes an occupant side panel facing the occupant and side surface panels that are connected by a seam to a peripheral end part of the occupant side panel and from side surfaces of the airbag. Furthermore, the occupant side panel and the side surface panels are connected so the fabric of both panels approximately match at a connection point.

Here, the "instrument panel" is in front of the front seats of the vehicle, a portion positioned below a windshield, is generally formed of resin, and also may be called a dashboard.

In addition, "toward the occupant side" can also be expressed as from the instrument panel to the rear in a diagonally upward direction.

In addition, "fabric" indicates the direction the weft threads or warp threads extend. Furthermore, "fabric matches" means that on both sides of the sewing point of the two panels, the weft thread or warp thread of a first panel is arranged parallel or orthogonal to the weft thread or warp thread of a second panel. Note that for woven fabric woven from orthogonal weft thread and warp thread, there is no difference between weft thread and warp thread after cutting to a panel shape.

With the present invention, the panels fabrics (weft thread or warp thread direction) are sewn so as to be orthogonal to the connection point on both sides of the connection point of two panels, and are set so the fabric of both panels match (are parallel); however, a slight misalignment is permitted.

With the present invention described above, at the connection point of the occupant side panel and the side surface panel, the fabric of both panels is connected so as to approximately match, stabilizing the deployed shape of a deployed airbag and enabling receiving the occupant with a non-deviating uniform pressure.

At the connection point of the occupant side panel and the side surface panel, inclination (displacement of fabric) of the fabric from both panels relative to a direction orthogonal to this connection point can be set to within 30°.

If the displacement of fabric (inclination) is roughly ±30°, the effect of the present invention can be achieved.

The side surface panel is formed of a single panel, both end parts are connected by a seam at a side surface of the airbag along a first connecting line extending in the front-to-back direction, and fabric of both end parts of the side surface panel are sewn so as to approximately match.

In this case, at the connection point with both end parts of the side surface panel, inclination (displacement of fabric) of the fabric from both panels relative to a direction orthogonal to this connection point can be set to within 30°.

The side surface panel can include a first side surface panel and a second side surface panel, where a structure is a first end part of the first side surface panel connected to a first end part of the second side surface panel and a second end part of the first side surface panel connected to a second end part of the second side surface panel by sewing the side surface of the airbag, and the sewing is performed such that the fabrics approximately match at the sewing point of the first and second side surface panels.

Note that the panels constituting the side surface panel are not limited to one or two panels, and may be three or more panels.

In this case, at the connection point with the first and second end parts, inclination (displacement of fabric) of the fabric from both panels relative to a direction orthogonal to this connection point can be set to within 30°.

The airbag can further include a mount part panel in contact with the instrument panel.

A curved part of the airbag in a deployed state is formed along a shape of the instrument panel below and to come into contact with the instrument panel, as viewed from the side in the vehicle width direction, and the mount part panel is connected by a seam at the lower end part of the side surface panel to form the curved part.

In this manner, the lower end part of the airbag is formed along the shape of the instrument panel enabling efficient use of the instrument panel as a reaction surface when the airbag deploys. As a result, the deployment behavior and deployment shape of the deployed airbag as a whole airbag is not violent, is controlled, and is stable.

A length in the front-to-back direction from an upper end of the curved part to the sewing point of the occupant side panel and the side surface panel along the airbag deploy direction when the airbag in a deployed state is viewed from the side in the vehicle width direction, is longer than a length in the vertical direction that is orthogonal to the deployment direction.

In this manner, the stroke of the airbag in the front-to-back direction is lengthened, increasing energy absorption performance when the occupant enters therein.

A diffuser connected to the inflator for controlling the flow of gas inside the airbag can be further provided.

The diffuser can be connected and arranged inside the mount part panel inside the airbag.

The occupant side panel can be formed in a generally rectangular shape.

Setting the occupant side panel to a rectangular shape provides an advantage of simplifying sewing with the side surface panel. The occupant side panel may be circular, or the like.

The occupant side panel and the side surface panel can be continuously formed from the same panel.

Here, "continuously from the same panel" means in the case the side surface panel is formed of a single panel, this panel and the occupant side panel are continuously connected. On the other hand, if the side surface panel is formed of a plurality of panels, the occupant side panel is connected continuously with one of the side surface panels. Continuously forming the side surface panel and the occupant side panel enables shortening the sewing length of both panels and simplifying aligning of the fabric.

Note that in the specification, claims, and drawings of the present application, "front" refers to the front (in the traveling direction) of a vehicle, "rear" refers to the rear (opposite the traveling direction) of the vehicle, "right" refers to the right side in the traveling direction, "left" refers to the left side in the traveling direction, and "vehicle width direction" refers to the left-to-right direction.

BRIEF DESCRIPTION OF THE DRAWINGS

FIGS. 8(A) and (B) are diagrams depicting a deployed state of the airbag according to the present invention, where (A) depicts a part of an appearance of FIG. 7 from above and (B) depicts a part of an appearance of FIG. 7 from below.

DESCRIPTION OF THE PREFERRED EMBODIMENTS

Occupant airbag devices according to embodiments of the present invention are described in detail below based on the accompanying drawings. Note that in the present embodiment, while an occupant P is based on an experimental dummy, it goes without saying that the same functions will be achieved with an actual occupant (human).

Figure 1:
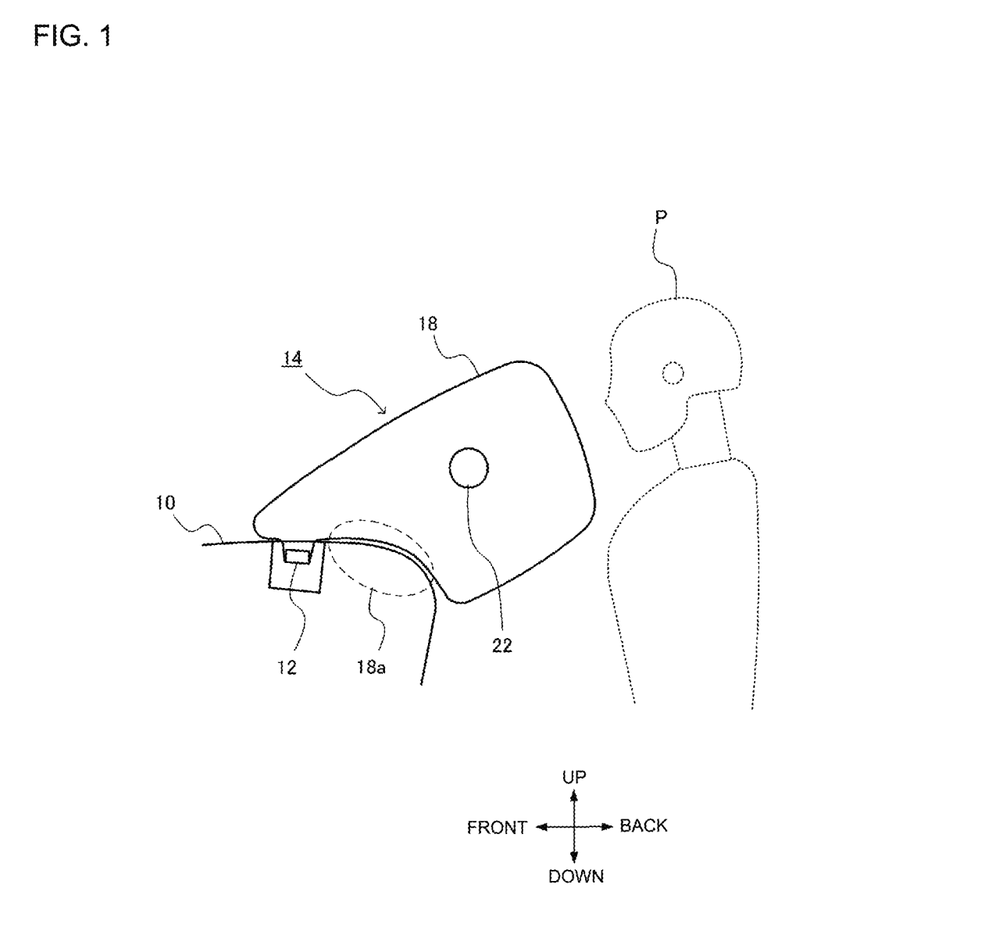
FIG. 1 is a side view depicting an airbag in the airbag device according to the present invention in a deployed state.
Figure 2:
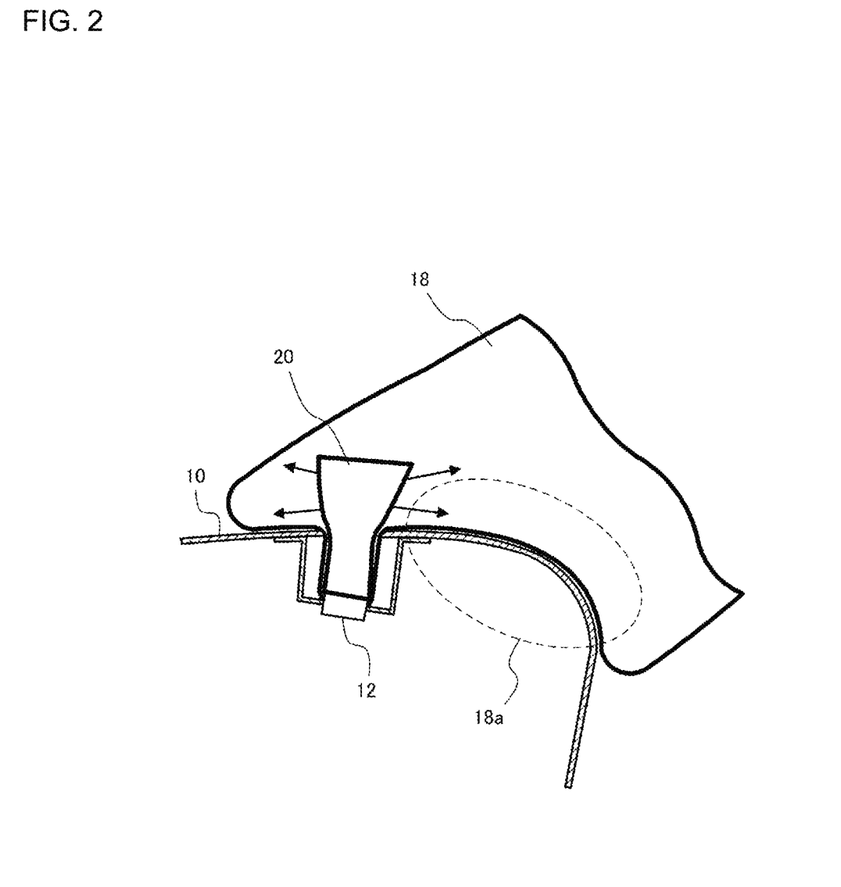
FIG. 2 is a cross section view depicting the airbag according to the present invention and depicts the structure surrounding an instrument panel.

FIG. 1 is a side view depicting an airbag (18) of an airbag device (14) according to the present invention in a deployed state. FIG. 2 is a cross section view depicting a deployed state of the airbag (18) and depicts the structure surrounding an instrument panel (10).

The airbag device 14 according to the present invention is for protecting an occupant P in a passenger seat of a vehicle, is stowed in the instrument panel 10, and is provided with an inflator 12 that generates expansion gas and an airbag 18 for restraining the occupant P that expands and deploys from the instrument panel 10 toward the occupant P based on the gas discharged from the inflator 12.

As depicted in FIG. 1, vent holes 22 for expelling gas externally are formed in both left and right sides of the side surface of the airbag 18.

As depicted in FIG. 1 and FIG. 2, the bottom portion of the airbag 18 has a curved part 18a formed so as to match the shape of the instrument panel 10.

As depicted in FIG. 2, the inside of the airbag 18 is provided with a diffuser 20 for controlling flow of gas in the airbag 18. The lower end part of the diffuser 20 is connected to the inflator 12 so that gas from a side surface of the upper portion is dispersed and directed into the airbag 18. Thus, gas is able to rapidly fill the airbag 18 that is long in the front-to-back direction.

Note that the diffuser 20 can be formed by the same base cloth as the airbag 18.

Figure 3:
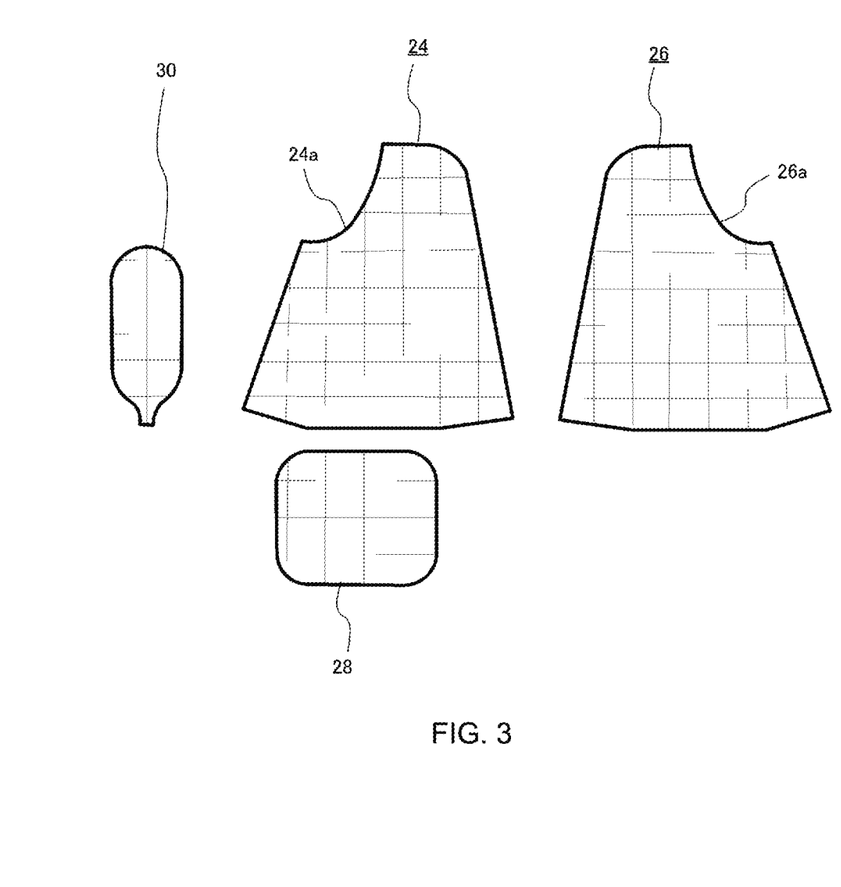
FIG. 3 is a plan view depicting a panel configuration (base cloth pattern) of the airbag according to the present invention.
Figure 4:
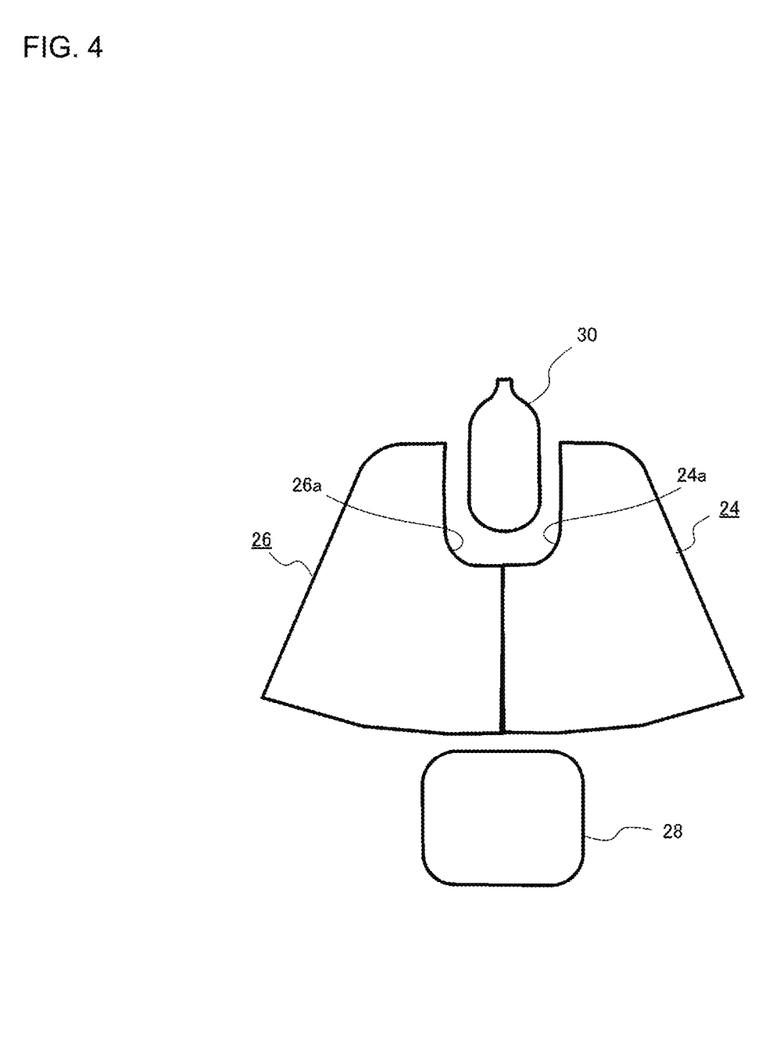
FIG. 4 is a plan view depicting a state of each panel in the base cloth pattern depicted in FIG. 3 assembled together.

FIG. 3 is a plan view depicting a panel configuration (base cloth pattern) of the airbag 18. FIG. 4 is a plan view depicting a state of each panel in the base cloth pattern depicted in FIG. 3 assembled together. In FIG. 3, the fine lines in the grid outline the direction of the fabric grain of the base cloth. The actual fabric grain is very fine and so will not be depicted on the drawings. In addition, the same goes for other drawings, the fine lines in the grid indicate the direction of the fabric.

Figure 5:
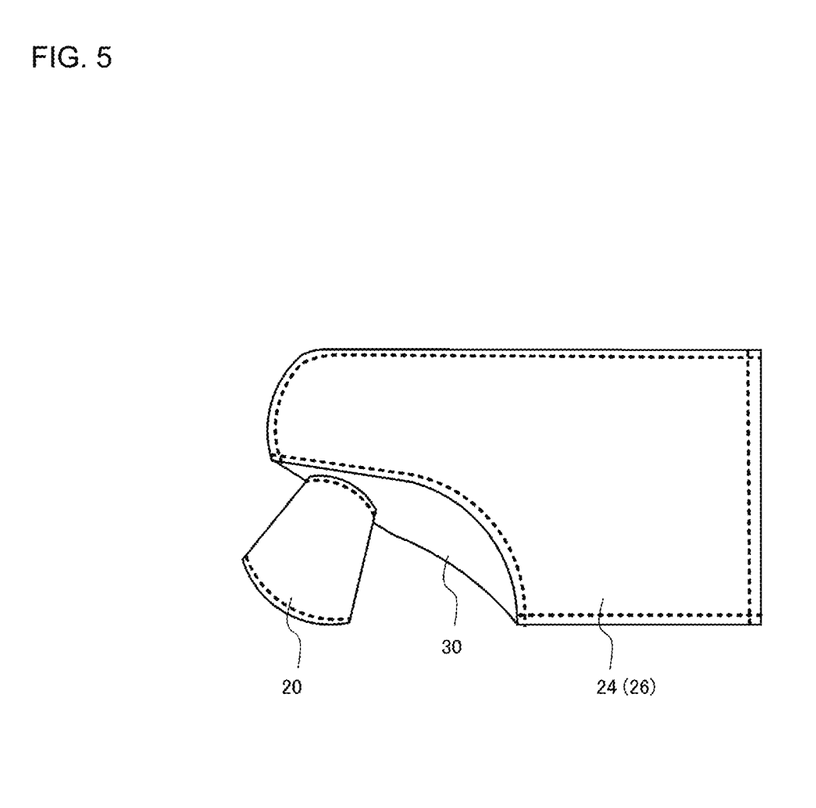
FIG. 5 is an explanatory diagram (plan view) depicting an appearance of the airbag according to the present invention after sewing.
Figure 6:
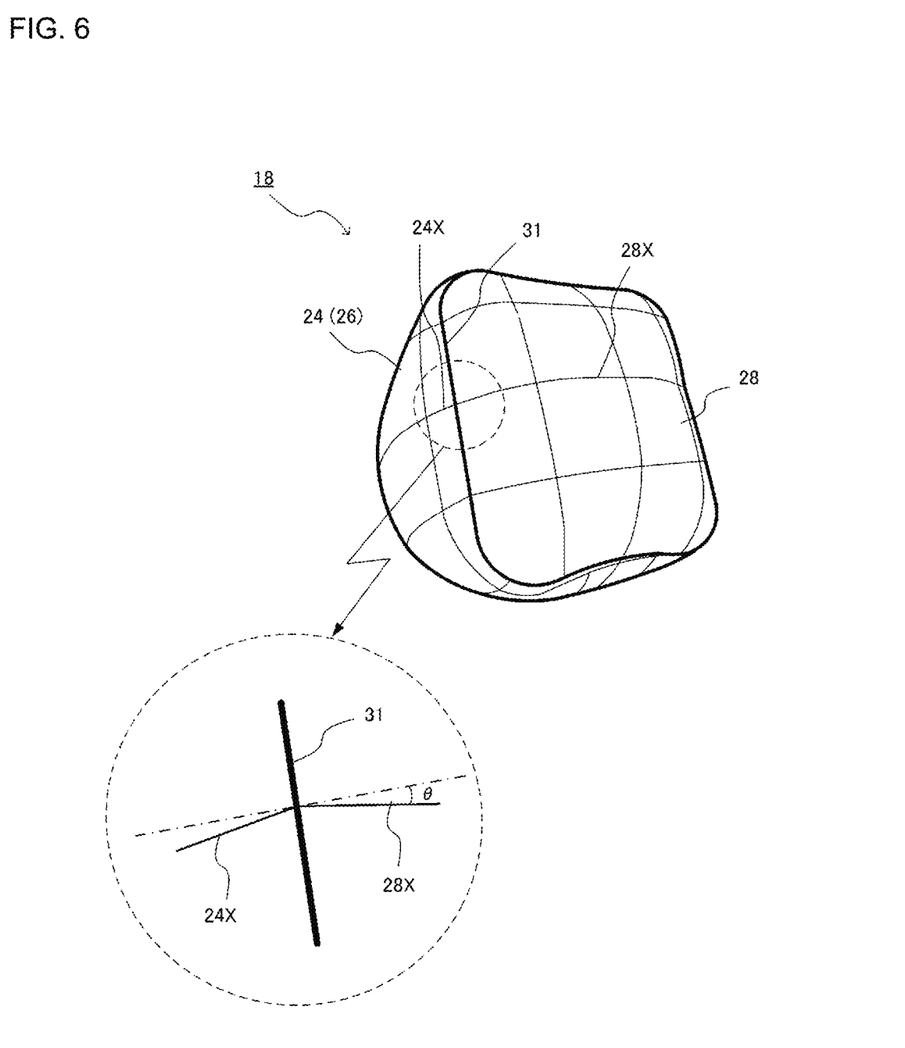
FIG. 6 is a perspective view depicting an appearance of a deployed state of the airbag according to the present invention as viewed from the occupant side.
Figure 7:
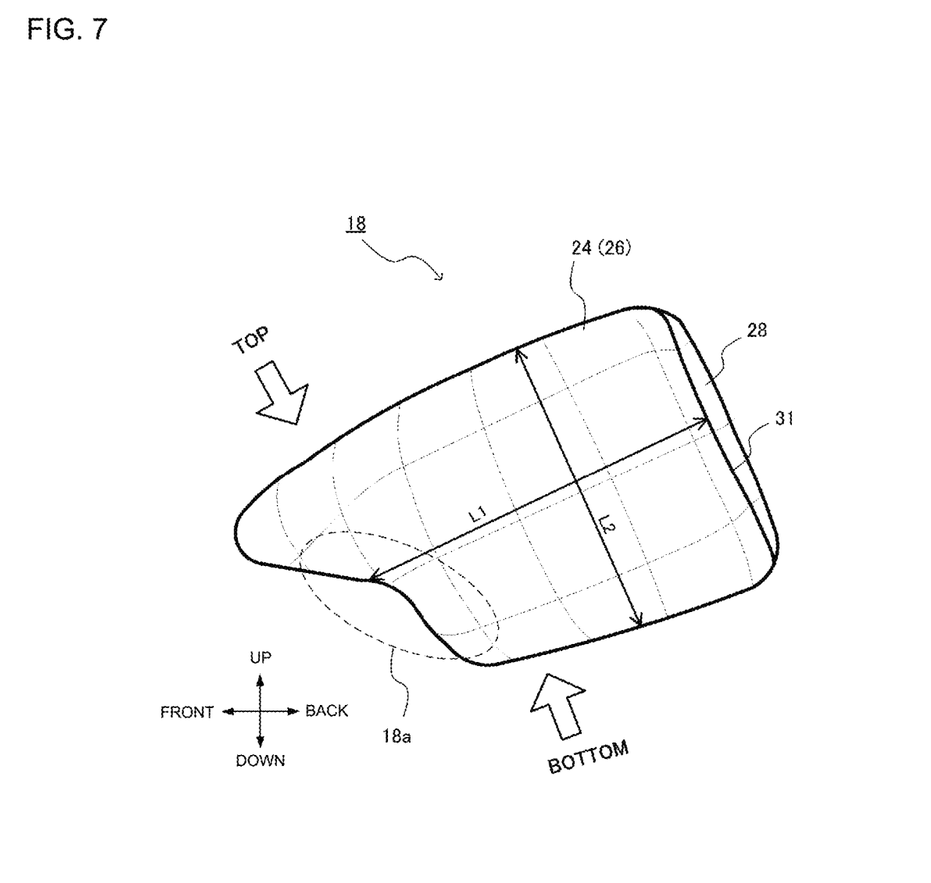
FIG. 7 is a perspective view depicting an appearance of the airbag according to the present invention in a deployed state from a side in the vehicle width direction.

FIG. 5 is an explanatory diagram (plan view) depicting the appearance of the airbag 18 after sewing. FIG. 6 is a perspective view depicting the deployed state of the airbag 18 as viewed from the occupant P side. In addition, FIG. 7 is a perspective view depicting the appearance of the airbag 18 in a deployed state from the side in the vehicle width direction.

As depicted in FIG. 3, the airbag 18 is formed from a woven fabric of mutually orthogonal warp thread and weft thread.

As depicted in FIG. 3, FIG. 4, and FIG. 6, the airbag 18 includes an occupant side panel 28 facing the occupant and side surface panels 24 and 26 that are connected by a seam to a peripheral end part of the occupant side panel 28 and form side surfaces of the airbag 18.

The occupant side panel 28 used in the present Embodiment is formed in a generally rectangular shape with rounded corners, but other shapes, such as circular or oval, can be used.

As depicted in FIG. 3, the side surface panels 24 and 26 are formed with the same shape. Bent parts 24a and 26b are formed in the side surface panels 24 and 26. Furthermore, as depicted in FIG. 4, a mount part panel 30 is connected to a recess part formed by opposing these bent parts 24a and 26b.

As depicted in FIG. 5, at the stage of sewing, the diffuser 20 is connected on the outside of the mount part panel 30 and is thereafter pushed into the airbag 18.

As depicted in FIG. 6, the occupant side panel 28 and the side surface panels 24 and 26 are connected so the fabric of both panels approximately matches at a connection point 31. Here, "approximately match" means that cases where there is a slight relative inclination between fabric 28X of a first panel and fabric 24X of a second panel that are two panels connected together on both sides of the sewing point 31 is permissible. For example, if the displacement angle (inclination angle) e of the fabric is roughly ±30° relative to a perpendicular line (dashed line) at the sewing point 30, the effect of the present invention can be achieved.

As depicted in FIG. 5 and FIG. 7, a curved part 18a of the airbag 18 in a deployed state is formed along the shape of the instrument panel 10 below and to come into contact with the instrument panel 10, and a mount part panel 20 is connected by sewing to lower end parts of the side surface panels 24 and 26 to form the curved part 18a.

In this manner, the lower end part of the airbag 18 is formed along the shape of the instrument panel 10 enabling efficient use of the instrument panel 10 as a reaction surface when the airbag 18 deploys. As a result, the deployment behavior and deployment shape of the deployed airbag 18 as a whole airbag 18 is not violent, is controlled, and is stable.

FIGS. 8(A) and (B) are diagrams depicting the deployed state of the airbag 18, where (A) depicts a part of an appearance of FIG. 7 from above and (B) depicts a part of an appearance of FIG. 7 from below.

Figure 8:
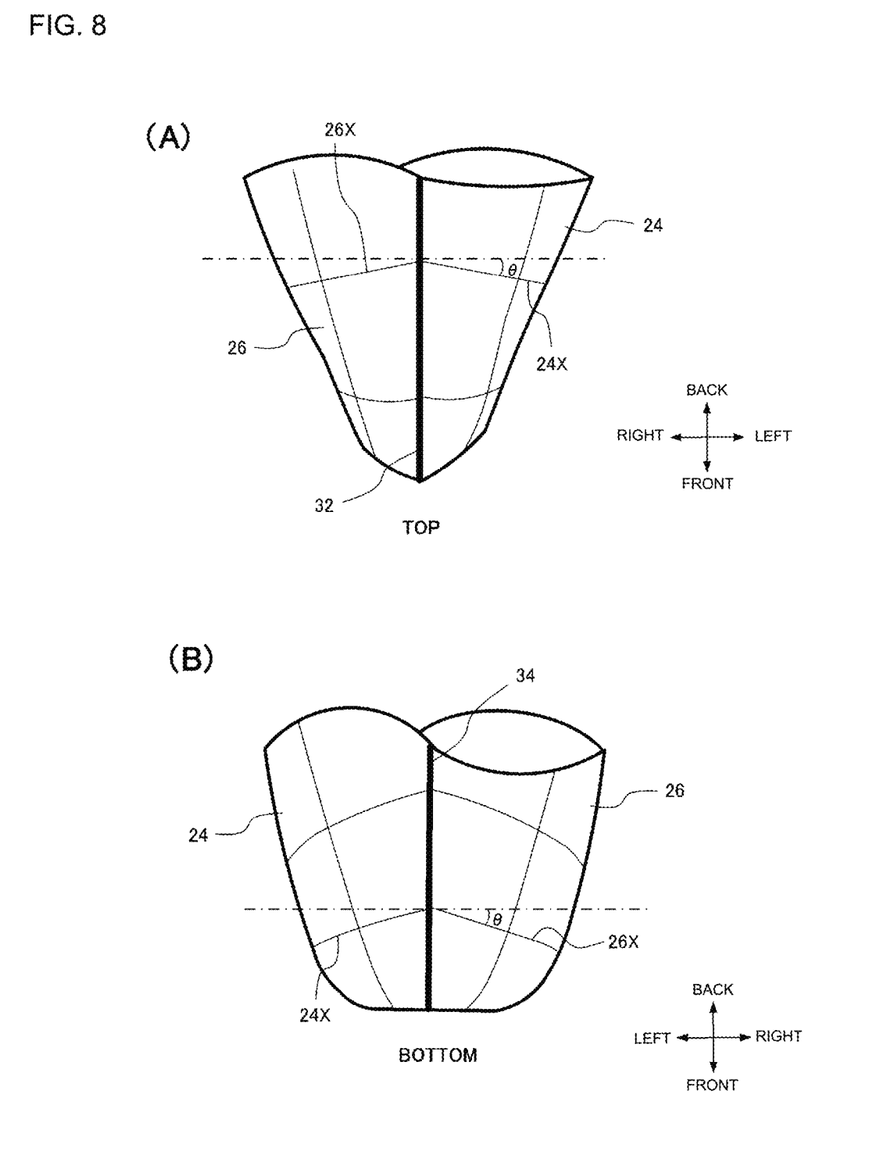

As depicted in FIG. 8, the two side surface panels 24 and 26 are connected to an upper end part and a lower end part of the airbag 18 by seams 32 and 34 that extend linearly in the front-to-back direction. At the connection points 32 and 34 of the side surface panels 24 and 26, the fabric of the two panels 24 and 26 is connected together so as to approximately match. Here, similar to that described above, "approximately match" means that cases where there is a slight relative inclination between fabric 24X of a first panel and fabric 26X of a second panel that are two panels 24 and 26 connected together on both sides of sewing points 32 and 34 is permissible. For example, if the displacement angle (inclination angle) e of the fabric is roughly ±30° relative to a perpendicular line (dashed line) at the sewing points 32 and 34, the effect of the present invention can be achieved.

Note that in the embodiment described above, the side surface panel is composed of two panels 24 and 26 but can be composed of a single side surface panel. In this case, both end parts of the side surface panels are sewn together at an upper part (32) and a lower part (34) of the airbag 18.

As depicted in FIG. 7, when the airbag 18 in a deployed state is viewed from the side in the vehicle width direction, the length L1 in the front-to-back direction along the airbag deployment direction from the upper end of the curved part 18a to the sewing point 31 of the occupant side panel 28 with the side surface panel is set larger than a length L2 in a vertical direction that is perpendicular to this deployment direction.

Figure 9:
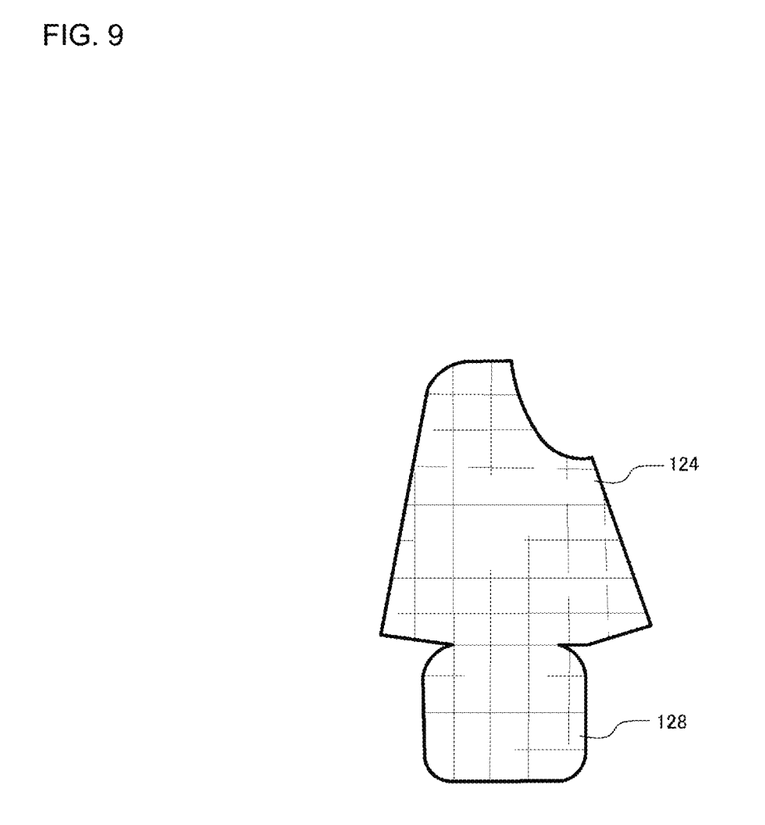
FIG. 9 is a plan view depicting a part of a panel constituting an airbag according to another aspect of the present invention.

FIG. 9 is a plan view depicting a part of a panel constituting an airbag according to another aspect of the present invention. In the aspect of FIG. 9, an occupant side panel 128 and one side surface panel 124 are continuously formed from a same panel.

Continuously forming the side surface panel 124 and the occupant side panel 128 enables shortening the sewing length of both panels and simplifying aligning of the fabric. In addition, more panels can be made from a base cloth with limited surface area, in other words, base cloth pattern efficiency can be increased.

Effect of the Invention

As described above, with the present invention, for the connection point 31 between at least the occupant side panel 28 and the side surface panels 24 and 26, the fabric of both panels is connected so as to approximately match, stabilizing the deployed shape of a deployed airbag 18 and enabling receiving the occupant with a non-deviating uniform pressure. In addition, with the connection points 32 and 34 on the side surface panels 24 and 26 as well, connecting the fabric of both panels so as to approximately match further stabilizes the deployed shape of the airbag 18.

Interpretation of the Technical Scope of the Present Invention

Examples of the present invention have been described above; however, the present invention is not limited in any way to the examples described above and can be changed as appropriate within the scope of the technical idea as that defined in the patent claims.

The invention claimed is:

1. An airbag device for protecting an occupant in a passenger seat of a vehicle, comprising:
    an inflator stowed in an instrument panel for generating expansion gas; and
    an airbag that utilizes the gas discharged from the inflator to expand and deploy from the instrument panel toward an occupant side to restrain the occupant; wherein
    the airbag is formed from cloth woven from mutually perpendicular weft thread and warp thread;
    the airbag includes an occupant side panel that faces the occupant and a side surface panel forming a side surface of the airbag that is connected to the occupant side panel by sewing around a peripheral end part of the occupant side panel, and
    at a connection point of the occupant side panel and the side surface panel, fabric of both panels is connected so as to approximately match.

2. The airbag device according to claim 1, wherein at the connection point of the occupant side panel and the side surface panel, inclination of the fabric from both panels relative to a direction orthogonal to this connection point is within 30°.

3. The airbag device according to claim 1, wherein the side surface panel is formed of a single panel, both end parts are connected by a seam at a side surface of the airbag along a first connecting line extending in a front-to-back direction, and fabric of both end parts of the side surface panel are sewn so as to approximately match.

4. The airbag device according to claim 3, wherein at a connection point of both end parts of the side surface panel, inclination of the fabric from both panels relative to a direction orthogonal to this connection point is within 30°.

5. The airbag device according to claim 1, wherein
the side surface panel includes a first side surface panel and a second side surface panel,
a structure that is a first end part of the first side surface panel is connected to a first end part of the second side surface panel and a second end part of the first side surface panel is connected to a second end part of the second side surface panel by sewing the side surface of the airbag, and
the sewing of the first and second side surface panels is performed such that the fabrics approximately match at the sewing point of the first and second side surface panels.

6. The airbag device according to claim 5, wherein at a connection point of first and second end parts, inclination of the fabric from both panels relative to a direction orthogonal to this connection point is within 30°.

7. The airbag device according to claim 1, wherein the airbag further includes a mount part panel that comes into contact with the instrument panel.

8. The airbag device according to claim 7, wherein
a curved part of the airbag in a deployed state is formed along a shape of the instrument panel below and to come into contact with the instrument panel, as viewed from a side in a vehicle width direction, and
the mount part panel is connected by a seam at a lower end part of the side surface panel to form the curved part.

9. The airbag device according to claim 8, wherein a length in a front-to-back direction from an upper end of the curved part to the sewing point of the occupant side panel and the side surface panel along an airbag deploy direction when the airbag is in the deployed state as viewed from the side in the vehicle width direction, is longer than a length in a vertical direction that is orthogonal to a deployment direction.

10. The airbag device according to claim 1, further comprising a diffuser connected to the inflator for controlling flow of gas inside the airbag.

11. The airbag device according to claim 10, wherein the diffuser is connected and arranged inside a mount part panel inside the airbag.

12. The airbag device according to claim 1 wherein the occupant side panel is formed generally rectangular in shape.

13. The airbag device according to claim 1, wherein the occupant side panel and the side surface panel are formed continuously from the same panel.

14. A vehicle including the airbag device according to claim 1.

* * * * *